United States Patent [19]

Kanno et al.

[11] 4,341,436
[45] Jul. 27, 1982

[54] LENS CAP

[75] Inventors: Hideo Kanno, Kawasaki; Yoshiki Suzuki, Tokyo, both of Japan

[73] Assignee: Nippon Kogaku K.K., Tokyo, Japan

[21] Appl. No.: 181,977

[22] Filed: Aug. 28, 1980

[30] Foreign Application Priority Data

Oct. 5, 1979 [JP] Japan .............................. 54-137360

[51] Int. Cl.³ .............................................. G02B 23/16
[52] U.S. Cl. ..................................... 350/65; 220/326; 292/42; 292/175
[58] Field of Search ................... 350/65; 220/326, 281; 215/358; 292/42, 32, 175, 163

[56] References Cited

U.S. PATENT DOCUMENTS

| | | | |
|---|---|---|---|
| 336,316 | 2/1886 | Hillery | 292/42 |
| 597,574 | 1/1898 | Dick | 292/42 |
| 907,085 | 12/1908 | McNutt | 292/42 |
| 1,374,732 | 10/1919 | Hamilton | 292/175 |
| 2,535,275 | 12/1950 | Dixon | 220/326 |
| 2,866,574 | 12/1958 | Roumeliotis | 220/326 |

FOREIGN PATENT DOCUMENTS 7101 of 1903 United Kingdom .................. 292/32

Primary Examiner—Jon W. Henry
Attorney, Agent, or Firm—Shapiro and Shapiro

[57] ABSTRACT

A lens cap has a disc-shaped cap body, a pair of sliding members opposed to each other on the cap body and slidable diametrically of the cap body, and a biasing member for biasing the sliding members in a direction in which they are extended outwardly from the cap body. The sliding members have connecting portions engageable with a connecting portion provided on the inner peripheral surface of the rim of a lens barrel. The lens cap is mounted on the lens barrel by engagement between the connecting portions. Engaging members are provided at the opposed ends of the sliding members and limit the outward extension of the sliding members from the cap body against the biasing means by mutual engagement therebetween.

2 Claims, 5 Drawing Figures

LENS CAP

BACKGROUND OF THE INVENTION

1. Field of the Invention

This invention relates to a lens cap of a camera or the like.

2. Description of the Prior Art

Among conventional lens caps, there is one in which two diametrically slidable sliding members are provided on a disc-shaped cap body and these sliding members are biased by a biasing member in the directions in which they are extended outwardly of the cap body. Connecting portions to be coupled to the connecting portion of the inner periphery of a rim formed at the end of a camera lens barrel are formed at the ends of the sliding members. The operator inwardly presses the sliding members by his thumb and index finger against a biasing force and directly disposes this lens cap on the front face of the lens barrel of the camera, and then releases the sliding members, whereby the operator can mount this lens cap on the end of the lens barrel. That is, upon release of the sliding members, the sliding members are slid outwardly by the biasing force, so that the connecting portions formed on the end faces of the sliding members are engaged with the connecting portion provided on the inner peripheral surface of the rim of the end of the lens barrel, whereby the lens cap is mounted on the lens barrel. This lens cap may be removed from the lens barrel by a procedure reverse to the above-described procedure. In a state wherein such lens cap has been removed and is left as it is, each sliding member being extended from the lens cap body by the biasing force must be limited (otherwise, the lens cap would be disjointed). The above-described conventional cap has engaging portions on two sliding members, respectively, and also has two engaging portions at the positions of the cap body which are opposed to said engaging portions. By the engagement between the engaging portion of one of the sliding members and one of the engaging portions of the cap body and the engagement between the engaging portion of the other sliding member and the other engaging portion of the cap body, the outward extension of the respective sliding members has been limited. That is, four engaging portions had to be provided and this has led to a complex construction.

SUMMARY OF THE INVENTION

It is the object of the present invention to eliminate the above-noted disadvantages and to provide a lens cap which is simple in construction.

The invention will become fully apparent from the following detailed description thereof taken in conjunction with the accompanying drawings.

DESCRIPTION OF THE PREFERRED EMBODIMENTS

Figure 1:
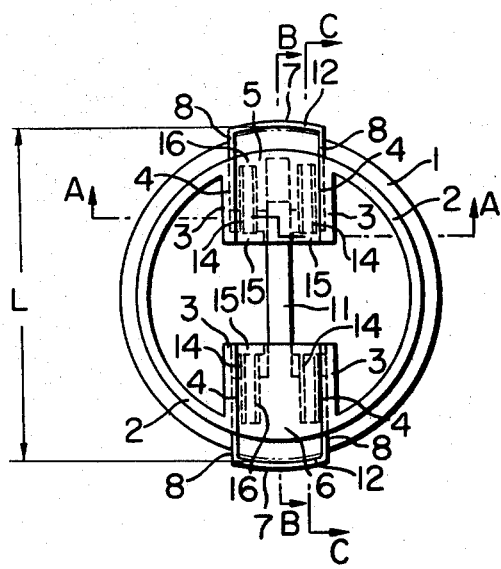
FIG. 1 is a plan view of an embodiment of the present invention.
Figure 2:
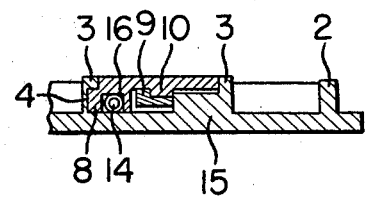
FIG. 2 is a cross-sectional view taken along line A—A of FIG. 1.
Figure 3:
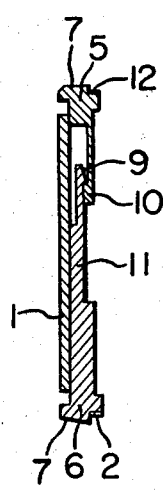
FIG. 3 is a cross-sectional view taken along line B—B of FIG. 1.
Figure 4:
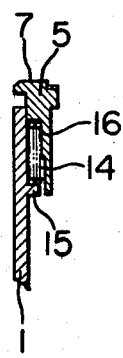
FIG. 4 is a cross-sectional view taken along line C—C of FIG. 1.
Figure 5:
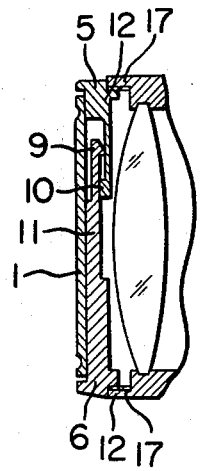
FIG. 5 is cross-sectional view showing the cap of the present invention as mounted on a lens barrel.

An embodiment of the present invention will hereinafter be described with reference to the drawings. In FIGS. 1 to 4, reference numeral 1 designates a disc-shaped cap body formed of plastics or the like, for example, and as shown in FIGS. 1 and 2, a ridge 2 is projectedly provided in the inner surface of this body 1 along the circumferential edge thereof. Opposed wall members 3 extending diametrically of the body 1 are projectedly provided in the circumferential edge portion of the body 1, and sliding grooves 4 are formed in the opposed surface portions of the wall members 3. Designated by 5 and 6 are sliding members formed of plastics or the like similarly to the body 1. These sliding members are disposed between the wall members 3 of the body 1 and each of them has a pressing portion 7 and a sliding portion 8 insertable in the sliding groove 4. That is, the sliding members 5 and 6 are slidable diametrically of the cap body and these two members are opposed to each other as shown in FIG. 1. As clearly shown in FIG. 3, that side of the sliding member 5 which is opposite from the pressing portion 7 is formed with an engaging projection 10 engaging the resiliently deformable engaging projection 9 of the sliding member 6. The resiliently deformable engaging projection 9 is formed on the tip end of the other end portion 11 extending a great length in the opposite direction from the pressing portion 7 of the sliding member 6. On the end face of each of the sliding members 5 and 6, a portion 12 of thread is formed as a connecting portion of lens barrel shown in FIG. 5, namely a connecting portion engageable with a threaded portion 17 formed in the inner periphery of the rim of the end portion of the lens barrel of the camera. Designated by 14 are springs for normally biasing the sliding members 5 and 6 outwardly (in FIG. 4, biasing the sliding member 5 upwardly in the plane of the drawing sheet). The springs 14, as clearly shown in FIG. 4, are held by a projection 15 of the cap body 1 and a recess 16 formed in a portion of the sliding members 5, 6. In the drawings, two sliding members are provided and they are identical in construction with the exception that the sliding member 5 is provided with the projection 10 and that the sliding member 6 is provided with the elongated end portion 11 and the projection 9. Further, the mechanisms 3, 4, 15 for holding the sliding members 5 and 6 are of the same construction.

In the above-described lens cap, the members 2–4 and 15 are formed integrally with the cap body 1, the members 7, 8, 10, 12 and 16 are formed integrally with the sliding member 5, and the members 7–9, 11 and 12 are formed integrally with the sliding member 6.

Description will now be made of the procedure of assembling the cap body 1 and the sliding members 5, 6. First, the springs 14 are placed with one end thereof bearing against the projection 15 of the body 1, and then the sliding portions 8 of the sliding members 5 and 6 are inserted into the sliding groove 4. Then, the springs 14 are interposed between the recess 16 of the sliding members 5, 6 and the projection 15 and at the same time, the pressing portions 7 are pressed against the spring force of the springs 14 to thereby move the sliding members 5 and 6 toward the inner side of the body 1. During this sliding movement, the engaging projection 9 of the sliding member 6 frictionally contacts the engaging projection 10 of the sliding member 5, so that the end portion provided with the projection 9 is resiliently deformed and the projection 9 rides across the projection 10 and resiliently returns. By this resilient return, the engaging projection 9 engages the engaging projection 10 as is clearly shown in FIG. 3. In this manner, the sliding members 5 and 6 are incorporated into the body 1, and the thus incorporated sliding members 5 and 6 are normally biased outwardly by the spring force of the springs 14 and are limited in outward extension by the engagement between the engaging projection 9 and the engaging projection 10. This state is shown by FIGS. 1 to 4. At this time, the distance L between the connecting portions 12 of the sliding members 5 and 6 is somewhat greater than the inside diameter of the connecting portion, namely, the threaded portion 17 formed in the inner periphery of the rim of the end portion of the lens barrel. Attachment of this cap will now be described with reference to FIG. 5. To attach this cap to the connecting portion 17, the pressing portions 7 of the sliding members 5 and 6 are first gripped and pressed by the thumb and the index finger to thereby make the dimension L smaller than the inside diameter of the connecting portion 17. The two threaded portions 12 are directly inserted into the inner periphery of the connecting portion 17 to release the pressure force of the sliding members 5, 6. Upon release of this pressure force, the sliding members 5 and 6 are biased outwardly by the spring force of the springs 14, so that the threaded portions 12 engage the inner peripheral surface of the rim provided at the end of the lens barrel and thus, the threaded portions 12 can be reliably fixed without inadvertently slipping off the threaded portion of the lens barrel. The cap may be removed by carrying out a procedure reverse to the above-described procedure.

In this manner, assembly, mounting and removal can all be accomplished by one touch.

In the foregoing description of the assembling procedure, the end having the engaging projection 9 has been described as being resiliently deformed and riding across the projection 10, but it is also possible to design the end having the projection 10 so as to be resiliently deformed or both ends may be resiliently deformed.

According to the present invention, as described above in detail, the engagement between the engaging portions provided on the two sliding members limits the outward extension of the sliding members and therefore, provision of two such engaging portions is sufficient and this leads to the provision of a lens cap which has a smaller number of engaging portions than the prior art lens cap and which is simpler in construction. Of course, the simpler construction in turn leads to a lower cost and greater ease with which the lens cap is manufactured.

We claim:

1. In a lens cap mountable on a rim formed at the end of a lens barrel, said lens cap having:

a disc-shaped cap body;

a pair of sliding members opposed to each other on said cap body and slidable diametrically of said cap body; and a biasing member for biasing said sliding members in a direction in which they are extended outwardly from said cap body;

said sliding members having connecting portions engageable with a connecting portion provided on the inner peripheral surface of the rim of said lens barrel, said lens cap being mounted on said lens barrel by engagement between said connecting portions;

the improvement comprising engaging members provided at opposed ends of said sliding members, said engaging members limiting the outward extension of said sliding members from said cap body against said biasing means by mutual engagement therebetween, and wherein at least one of said engaging members is supported on a sliding member by a resilient member, and as said sliding members are slid against said biasing member for the assembly of said lens cap, said engaging members bear against each other and said resilient member is resiliently deformed to enable one of said engaging members to ride across and come into engagement with the other engaging member.

2. A lens cap according to claim 1, wherein both engaging members are supported on the sliding members by resilient members.

* * * * *